US006731236B1

(12) United States Patent
Hager et al.

(10) Patent No.: US 6,731,236 B1
(45) Date of Patent: May 4, 2004

(54) METHODS AND APPARATUS FOR OPTIMIZING INTERFEROMETRIC RADAR ALTIMETER CROSS TRACK ACCURACY

(75) Inventors: James R. Hager, Golden Valley, MN (US); Larry D. Almsted, Bloomington, MN (US); Lavell Jordan, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/459,137

(22) Filed: Jun. 11, 2003

(51) Int. Cl.$^7$ ................................................. G01S 7/40
(52) U.S. Cl. ........................ 342/174; 342/120; 342/121
(58) Field of Search ................................ 342/165, 173, 342/174, 120, 121, 122, 123

(56) References Cited

U.S. PATENT DOCUMENTS

| | | |
|---|---|---|
| 4,121,213 A | 10/1978 | Bush et al. |
| 4,683,473 A | 7/1987 | Haugland |
| 5,157,615 A * | 10/1992 | Brodegard et al. ......... 701/301 |
| 5,160,933 A | 11/1992 | Hager |
| 5,300,934 A | 4/1994 | Asbell et al. |
| 6,114,984 A | 9/2000 | McNiff |
| 6,205,400 B1 * | 3/2001 | Lin ............................ 701/214 |
| 6,246,960 B1 * | 6/2001 | Lin ............................ 701/214 |
| 6,427,122 B1 * | 7/2002 | Lin ............................ 701/214 |
| 2002/0069019 A1 * | 6/2002 | Lin ............................ 701/301 |
| 2002/0092350 A1 * | 7/2002 | Etkin et al. ............... 73/382 G |
| 2002/0165669 A1 * | 11/2002 | Pinto et al. ................. 701/213 |

OTHER PUBLICATIONS

"Establishing analytical criteria for selection of sites for calibration of spaceborne laser altimeters", Filin, S.; IGARSS '02. 2002 IEEE International, vol: 6, Jun. 24–28, 2002 Page(s): 3591–3594.*

"Pointing angle and timing calibration/validation of the Geoscience Laser Altimeter with a ground–based detection system", Magruder, L.A.; Schutz, B.E.; Silverberg, E.C.; IGARSS '01. IEEE 2001 International, vol: 4, Jul. 9–13, 2001 Page(s): 1584–1587.*

"Calibration of 1064 nm channel of LITE using playa surface returns", Cooley, T.W.; Reagan, J.A.; Geoscience and Remote Sensing Symp. IGARSS '95. 'Quantitative Remote Sensing for Science and Applications', Int'l, vol: 3, Jul. 10–14, 1995 Ps: 2326–2328.*

* cited by examiner

Primary Examiner—John B. Sotomayor
(74) Attorney, Agent, or Firm—Matthew Luxton, Esq.; Armstrong Teasdale LLP

(57) ABSTRACT

An apparatus for calibrating a radar altimeter is described. The altimeter provides an angle to a target based on radar energy received at right, left, and ambiguous antennas. The apparatus comprises a turntable on which the radar is mounted, a turntable controller which controls positioning of the radar altimeter, a radar energy source receiving transmit signals from the radar altimeter, a reflector, and a calibration unit. The reflector reflects and collimates radar energy from the radar source towards the radar altimeter. The calibration unit receives an angle from the controller indicative of a position of the radar altimeter with respect to the collimated radar energy and a measured angle from the radar altimeter. The calibration unit calculates a correction based on differences between the angle received from the turntable and the measured angle received from the altimeter and provides the calibration correction to the altimeter.

19 Claims, 2 Drawing Sheets

METHODS AND APPARATUS FOR OPTIMIZING INTERFEROMETRIC RADAR ALTIMETER CROSS TRACK ACCURACY

BACKGROUND OF THE INVENTION

This invention relates generally to radar altimeters, and more specifically to, methods and apparatus for calibration of multiple antenna radar altimeters.

Interferometric synthetic aperture radar altimeters are used to provide precision terrain navigation. The precision terrain navigation is provided, at least in part, by measuring a cross track angle to the highest ground point or radar target that reflects radar energy back to the radar altimeter. Typically, the radar energy is transmitted from the radar altimeter in a cross track doppler swath below the aircraft on which the radar altimeter is incorporated. In one system, the cross track angle is measured by processing phase differences or time of arrival differences of radar return signals from the target at three separate antennas precision spaced and positioned on a baseline passing through the pitch axis of the aircraft.

Angular accuracy of typically on the order of fractions of a milli-radian is required for such precision terrain navigation. A radar processor which receives the radar return signals from the three antennas will provide such milli-radian accuracy if an exact measurement of antenna spacing and positioning is provided, and if exact cable delay and processing differences through the three radar channels to the radar processor is known. However, even with very careful assembly of an antenna assembly which includes the three radar antennas, the resulting errors in the cross track angle, or radar measured angle, are more than can be tolerated by a navigation system. Factors in the antenna assembly which can cause such errors include, for example, measurement and subsequent cutting of the cabling utilized in the assembly which connect the three antennas to the radar processor, and routing of the cables within the antenna assembly.

Present calibration methods utilize ground radar reflectors, whose exact positions are known through surveying, to provide known target positions to be used to calibrate the aircraft mounted radar altimeter during a flight test. The flight test calibration method, suitable for testing experimental data collection systems such as used in the development of radar terrain elevation maps, is far too costly for a production radar environment where several hundred radar altimeters might typically be produced each month.

BRIEF SUMMARY OF THE INVENTION

An apparatus for calibrating an interferometric radar altimeter is provided. The radar altimeter provides an interferometric angle to a target based on radar energy received at a right antenna, a left antenna, and an ambiguous antenna located between the right and left antennas. The apparatus comprises a turntable on which the radar is mounted, a turntable controller which controls positioning of the radar altimeter on the turntable, a radar energy source receiving transmit signals from the radar altimeter, a reflector, and a calibration unit. The reflector reflects radar energy from the radar source towards the radar altimeter on the turntable and collimates the radar energy reflected to the turntable. The calibration unit receives an angle from the turntable controller indicative of a position of the radar altimeter and a measured angle from the radar altimeter indicative of a perceived orientation of the radar altimeter with respect to the collimated radar energy. The calibration unit calculates a radar calibration correction based on a difference between the angle received from the turntable and the measured angle received from the radar altimeter. The calibration unit then provides the calibration correction to the radar altimeter. The radar altimeter can then be installed in a vehicle.

In another aspect, a method for determining discrepancies between an orientation of a radar altimeter and a measurement of the orientation by the radar altimeter is provided. The radar altimeter has a plurality of receiving antennas, and the discrepancies are caused by varying delays in processing the radar returns received at each receiving antenna. The method comprises mounting the radar altimeter in a known orientation, directing a collimated radar signal towards the radar altimeter, providing a radar measurement of an angle of the radar altimeter with respect to the collimated radar signal, and determining a difference between an angle representative of the known orientation and the radar measurement angle.

In still another aspect, a method for compensating a measured angle to a radar target provided by a radar altimeter is provided. The radar altimeter includes a plurality of receive antennas hard mounted to a chassis of the radar altimeter. The method comprises receiving a known orientation of the radar altimeter with respect to an expected radar return, directing a collimated radar signal towards the radar altimeter, receiving a radar measured angle resulting from the collimated radar signal, determining a difference between an angle representative of the known orientation and the radar measured angle, and providing radar calibration correction to the radar altimeter, the corrections causing the radar measured angle to be equal to the angle representative of the known orientation of the radar altimeter.

In yet another embodiment, a calibration unit receiving a radar measured angle and a turntable angle is provided. The turntable angle is indicative of an orientation of a radar altimeter with respect to a collimated radar signal. The calibration unit comprises a software code segment for calculating radar calibration corrections based on a difference between the two received angles.

DETAILED DESCRIPTION OF THE INVENTION

Figure 1:
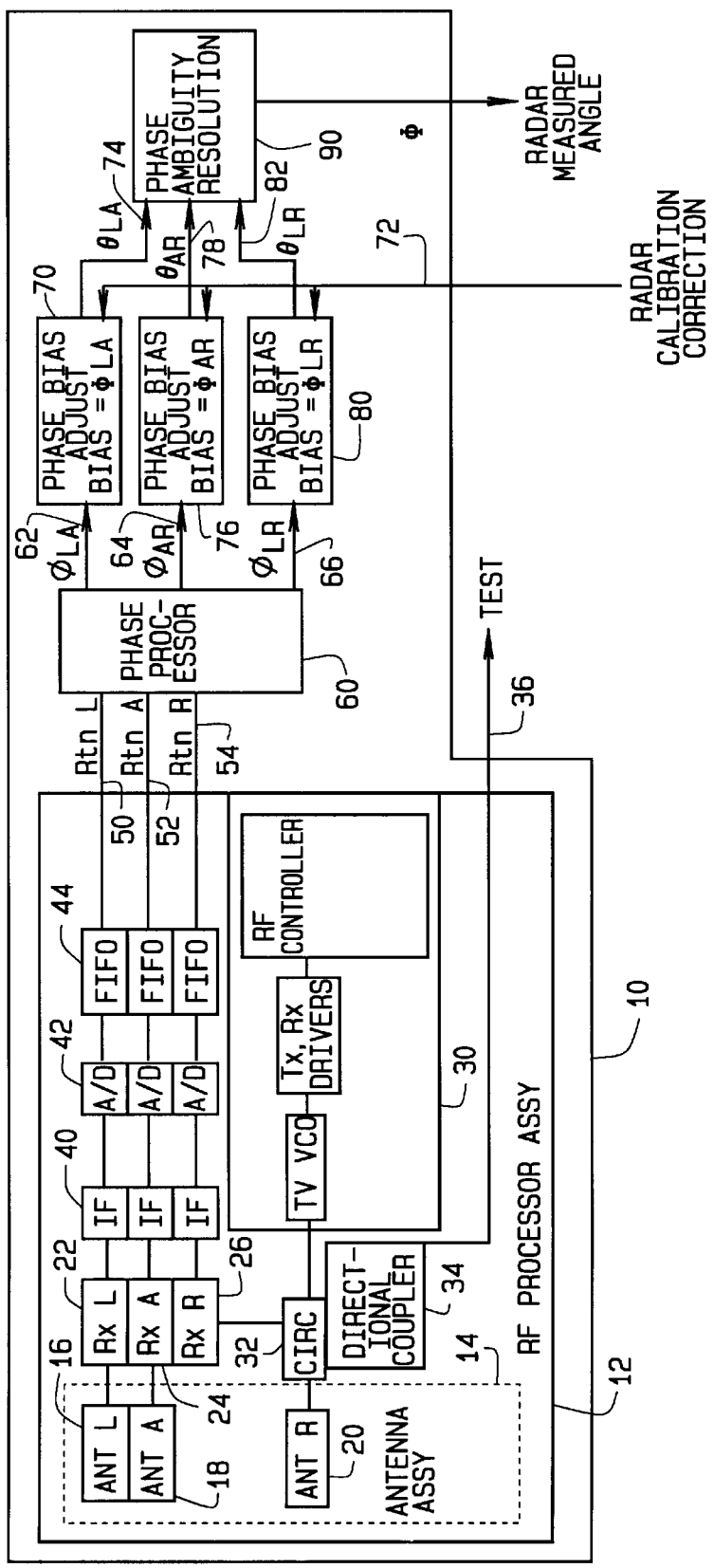
FIG. 1 is a diagram of a radar altimeter which includes three antennas, and output an angle to a radar target.

FIG. 1 is one embodiment of an interferometric radar altimeter 10. Radar altimeter 10 includes a RF processor assembly 12, which further includes an antenna assembly 14. Antenna assembly 14 includes three radar antennas, which are designated as a left antenna 16, an ambiguous antenna 18, and a right antenna 20. Ambiguous antenna 18 is physically located between left antenna 16 and right antenna 20, though not exactly between left antenna 16 and right antenna 20. In particular embodiment, exact distances between the three antennas are known. Antenna assembly 14 (and the three antennas) receive reflected radar pulses, the pulses having originated from a radar source. Specifically, left antenna 16 receives the pulses and forwards the electrical signal to left receiver 22. Ambiguous antenna 18 also receives the reflected radar signal, albeit at a slightly different time, and passes the received signal to ambiguous receiver 24. Right antenna 20 also receives the radar pulses, at a time which is slightly different than either left antenna 16 or ambiguous antenna 20, and forwards the electrical signal to right receiver 26.

In the embodiment shown, right antenna 20 is also configured as a transmit antenna, and further operates as a portion of the above mentioned radar source. A transmit assembly 30 within RF processor assembly 12 provides a transmit signal to a circulator 32, which functions to direct the transmit signal to right antenna 20 and also directs radar returns from antenna 20 to right receiver 26. Circulator is further connected to a directional coupler 34, which provides a radar transmit pulse to a test output 36, typically in the form of a connector output, and which does not utilize any of antennas 16, 18, and 20. Any one of antennas 16, 18, and 20 can perform the transmit function, if connected to circulator 32 for switching purposes.

Receivers 22, 24, and 26, respectively forward left, ambiguous, and right radar return signals for processing which includes intermediate frequency mixers 40, analog-to-digital converters 42, and FIFO buffers 44 for each of the three radar channels. After processing, RF assembly 12 outputs signals representative of radar signals received at left antenna 16, ambiguous antenna 18, and right antenna 20, specifically left radar return 50, ambiguous radar return 52, and right radar return 54.

A phase processor 60 receives left radar return 50, ambiguous radar return 52, and right radar return 54 and determines phase differences between the three radar returns. In the embodiment shown, phase processor 60 outputs a first phase signal 62 representative of the phase difference between left radar return 50 and ambiguous radar return 52. Phase processor 60 also outputs a second phase signal 64 representative of the phase difference between ambiguous radar return 52 and right radar return 54. Phase processor 60 further outputs a third phase signal 66 representative of the phase difference between left radar return 50 and right radar return 54.

Phase signals 62, 64, and 66 are output by phase processor 60 and received by phase bias adjust processors. Phase adjustment processors are incorporated within altimeter 10 to provide a mechanism for removing discrepancies inherent in the processing of three separate radar return signals due to signal path distances, cabling, and other sources of signal delay from antennas 16, 18, and 20 to phase processor 60. In the embodiment shown, phase signal 62 from phase processor 60 is received by phase bias adjust processor 70 which also receives a calibration correction factor 72. Calibration correction factor 72 and phase signal 62 are combined within phase bias adjust processor 70 to provide an adjusted phase signal 74 which has had errors due to different signal delays between left and ambiguous radar channels removed based upon calibration correction factor 72. The same methodology is utilized to correct signal delay errors between ambiguous and right radar channels in phase bias adjust processor 76 which provides phase adjusted signal 78. Phase bias adjust processor 80 provides a phase adjusted signal 82 which is representative of corrected signal delay errors between left and right radar channels.

Phase adjusted signals 74, 78, and 82 are received at phase ambiguity resolution processor 90. Within processor 90, phase relationships between phase adjusted signals 74, 78, and 82 are used, along with other signals (not shown) to determine an interferometric angle, Φ, from an aircraft to a target. Interferometric angle is also sometimes referred to as a radar measured angle, and errors in radar measured angle is sometimes referred to as cross track accuracy. Calibration correction factors 72 which provide compensation for signal delay errors due to signal path length and other sources of delay must be determined before radar altimeter 10 can be utilized for its above described intended purpose. Flight testing such radar altimeters can provide such calibration correction factors, through use of precisely position radar targets as described above, but flight testing to remove processing discrepancies between three radar channels is expensive, especially for a production radar.

Figure 2:
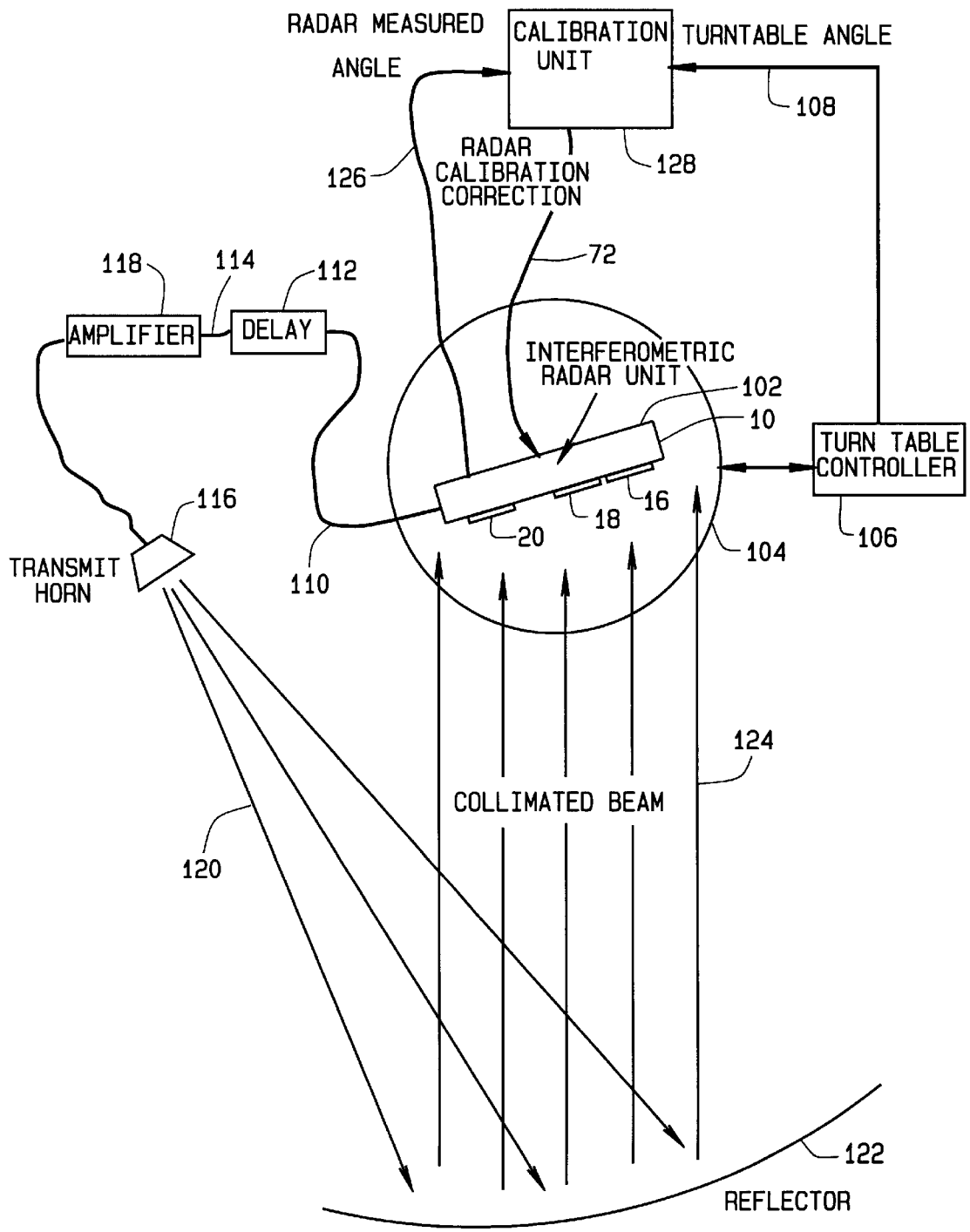
FIG. 2 illustrates an apparatus for calibrating the radar assembly of FIG. 1.

FIG. 2 is a diagram of an apparatus 100, which allows determination of radar calibration correction factors, at a cost which is less than the costs associated with flight testing, and which further embodies an interferometric radar altimeter cross track accuracy optimization method. Apparatus 100 provides interferometric radar calibration, and specifically optimizes the cross track angular accuracy of radar altimeter 10 by forcing a best fit of the radar solution (e.g. radar measured angle) to a precision calibrated target source in a production environment. In the embodiment shown in FIG. 2, and described above with respect to FIG. 1, radar altimeter 10 is packaged as a unitary assembly with three antennas 16, 18, and 20 hard mounted to a chassis 102.

Referring specifically to FIG. 2, apparatus 100 includes a turntable 104 whose positioning is accurately controlled utilizing a turntable controller 106. Turntable controller 106 is equipped to provide an output 108 that includes at least a position of turntable 104 as an angle. Mounting radar altimeter 10 on turntable 104 provides a known orientation of radar altimeter 10, based on output 108. Output 108 is sometimes referred to as a truth angle. A radar transmit pulse 110 is sampled through directional coupler 36 (shown in FIG. 1) and delayed by a precision radar delay 112. Precision radar delay 112 delays transmission of radar transmit pulse 110, so that a radar return that is detected by radar altimeter 10, appears to have come from a distant target. The delayed transmit pulse 114 is amplified for transmission through a radar transmit horn 116 by amplifier 118. In one embodiment, radar transmit horn 118 is a narrow beam horn antenna which consolidates and directs the resulting radar transmit signal 120 to a reflector 122. Reflector 122 collimates and directs the energy of radar transmit signal 120 back towards radar altimeter 10 mounted on turntable 104 as a collimated beam 124. Radar delay 112 and reflector 122 together act to simulate a radar return from a distant target, based upon radar transmit pulse 110.

The energy of collimated beam 124 simulates a radar return from a distant target as radar returns from distant targets are nearly parallel. Collimated beam 124 is processed by radar altimeter 10, as described above with respect to FIG. 1, and results in radar altimeter 10 providing a radar measured angle 126 to a calibration unit 128 which also receives turntable angle 108. Turntable angle 108 is considered the known orientation of radar altimeter 10. Calibration unit 128 determines an error between radar measured angle 126 and turntable angle 108 which is utilized in determining radar calibration corrections 72.

In one embodiment, a zero degree setting on turntable 104 places radar altimeter 10 in a position where housing 102 is perpendicular to collimated beam 124. As collimated beam 124 should impinge antennas 16, 18, and 20 at the same moment in time, radar altimeter 10 should also provide a zero degree radar measured angle 126 to calibration unit 128. A zero degree reading in normal operating conditions (e.g. mounted on an aircraft) would indicate that the radar target is directly underneath radar altimeter 10. As radar altimeter 10 is rotated on precision turntable 104, individual antennas 16, 18, and 20 move closer to or farther away from reflector 122, and therefore are impinged by collimated beam 124 at different moments in time. To illustrate and referring to FIG. 2, in the position shown, antenna 20 will be impinged by collimated beam 124 before either of antennas 16 and 18. Antenna 18 will be impinged by collimated beam 124 before antenna 16. The difference in time of the received collimated beam 124 at each antenna 16, 18, and 20 results in a measured angle 126 other than zero being supplied to calibration unit 128.

However, as calibration unit 128 receives a turntable angle 108 from turntable controller 106 that is highly accurate, and considered to be the truth angle, any differences in radar measured angle 126 and turntable angle 108, are likely caused by delays in processing of the radar returns received at antennas 16, 18, and 20 as described above. Calibration unit 128 calculates radar calibration corrections 72 based on differences between radar measured angle 126 and the truth angle of turntable angle 108 at multiple orientations of turntable 104 to provide accurate corrections. Radar calibration corrections 72 are loaded in phase bias adjust processors 70, 76, and 80 to compensate for the processing delays caused by cable lengths, cable routing, and other sources of radar signal delay. Outputs of phase bias adjust processors 70, 76, and 80, adjusted phase signals 74, 78, and 82 are adjusted such that errors between radar measured angle 126 and turntable angle 108 are minimized, providing improved cross track accuracy. As the above described radar processing components of radar altimeter 10 are hard wired and co-located within chassis 102, and distances between antennas 16, 18, and 20 remain the same, and radar calibration corrections 72 are portable to a final installation of radar altimeter 10, for example, within an aircraft, as radar calibration corrections are stored within radar altimeter 10.

In one embodiment, in order to provide the precision needed to provide an accurate turntable angle 108, chassis 102 of radar altimeter 10 is mounted to turntable 104 via precision guide pins (not shown) and optimized in cross track accuracy through radar calibration corrections 72. After radar altimeter 10 is optimized for cross track accuracy, radar altimeter 10 is mounted via precision guide pins into an aircraft opening. All errors due to inter channel delay path differences (delays in processing of radar returns received at the three antennas), relative positioning of the three antennas with each other, and temperature dependent errors are minimized. In one embodiment, the above described calibration correction process is performed in an anechoic chamber, which absorbs radar returns from undesired paths. The anechoic chamber improves integrity of radar returns received at radar altimeter 10 as a portion of radar pulse 120 from transmit horn 116 which does not impinge upon reflector 122 is absorbed within the chamber rather than reflecting back towards radar altimeter 10 from other sources of reflection.

While the invention has been described in terms of various specific embodiments, those skilled in the art will recognize that the invention can be practiced with modification within the spirit and scope of the claims.

What is claimed is:

1. An apparatus for calibrating an interferometric radar altimeter, the radar altimeter providing an interferometric angle to a target based on radar energy received at a right antenna, a left antenna, and an ambiguous antenna located between the right and left antennas, said apparatus comprising:

a turntable on which the radar altimeter is mounted;

a turntable controller which controls positioning of the radar altimeter on said turntable;

a radar source receiving transmit signals from the radar altimeter;

a reflector which reflects radar energy from said radar source towards the radar altimeter on said turntable, said reflector positioned to collimate the radar energy reflected to said turntable; and a calibration unit receiving an angle from said turntable controller indicative of an orientation of the radar altimeter with respect to the collimated radar energy and a measured angle from the radar altimeter indicative of a perceived orientation of the radar altimeter with respect to the collimated radar energy, said calibration unit calculating a radar calibration correction based on a difference between the angle received from the turntable and the measured angle received from the radar altimeter, said unit providing the calibration correction to the radar altimeter.

2. An apparatus according to claim 1 wherein said radar source comprises a transmit horn coupled to one antenna of the radar altimeter.

3. An apparatus according to claim 2 wherein said radar source further comprises a delay element.

4. An apparatus according to claim 1 wherein said calibration unit calculates the radar calibration correction based upon multiple orientations of said turntable, and multiple measured angles from the radar altimeter.

5. A method for determining discrepancies between an orientation of a radar altimeter and a measurement of the orientation by the radar altimeter, the radar altimeter having a plurality of receiving antennas, the discrepancies caused by varying delays in processing the radar returns received at each antenna, said method comprising:

mounting the radar altimeter in a known orientation;

directing a collimated radar signal towards the radar altimeter;

providing a radar measurement of an angle of the radar altimeter with respect to the collimated radar signal; and determining a difference between an angle representative of the known orientation and the radar measurement angle.

6. A method according to claim 5 wherein said mounting comprises:

mounting the radar altimeter on a turntable whose position is controlled by a turntable controller; and receiving the known orientation from the turntable controller.

7. A method according to claim 6 wherein said mounting the radar altimeter on a turntable comprises utilizing precision guide pins to mount a chassis of the radar altimeter to the turntable.

8. A method according to claim 5 wherein said directing comprises:

orienting a reflector to reflect collimated radar signals to the radar altimeter; and transmitting a radar signal towards the reflector.

9. A method according to claim 5 wherein said directing comprises:

providing a transmit pulse from the radar altimeter; and delaying the transmit pulse to simulate a radar return from a distant target.

10. A method according to claim 5 wherein providing a radar measurement comprises:

processing radar returns received at three separate antennas; and determining an angle of the radar altimeter with respect to the collimated radar signal based on phase differences between the radar returns received at the three antennas.

11. A method for compensating a measured angle to a radar target provided by a radar altimeter, the radar altimeter including a plurality of receive antennas hard mounted to a chassis of the radar altimeter, said method comprising:

receiving a known orientation of the radar altimeter with respect to an expected radar return;

directing a collimated radar signal towards the radar altimeter;

receiving a radar measured angle resulting from the collimated radar signal;

determining a difference between an angle representative of the known orientation and the radar measured angle; and providing radar calibration corrections to the radar altimeter, the corrections causing differences between the radar measured angle and the angle representative of the known orientation of the radar altimeter to be reduced as compared to the determined difference.

12. A method according to claim 11 wherein receiving a known orientation of the radar altimeter comprises receiving a position of a turntable on which the radar altimeter is mounted, the position indicative of an orientation of the radar altimeter with respect to the expected radar return.

13. A method according to claim 12 wherein receiving a position comprises providing a turntable angle to a calibration unit.

14. A method according to claim 11 wherein receiving a radar measured angle resulting from the collimated radar signal comprises:

outputting a radar pulse from the radar altimeter; and delaying transmission of the radar pulse such that the received radar signal simulates a radar return from a distant target.

15. A method according to claim 14 further comprising providing a reflector which collimates the radar pulse and reflects the radar pulse towards the radar altimeter.

16. A method according to claim 11 wherein providing radar calibration corrections comprising determining calibration corrections based on a plurality of known orientations and radar measured angles which correspond to the known orientations.

17. A method according to claim 11 further comprising storing the radar calibration corrections in the radar altimeter.

18. A calibration unit receiving a radar measured angle and a turntable angle, the turntable angle indicative of an orientation of a radar altimeter with respect to a collimated radar signal, said calibration unit comprising a software code segment for calculating radar calibration corrections based on a difference between the two received angles.

19. A calibration unit according to claim 18 wherein said code segment calculates radar calibration corrections based upon a plurality of turntable angles and corresponding radar measured angles.

* * * * *